UNITED STATES PATENT OFFICE.

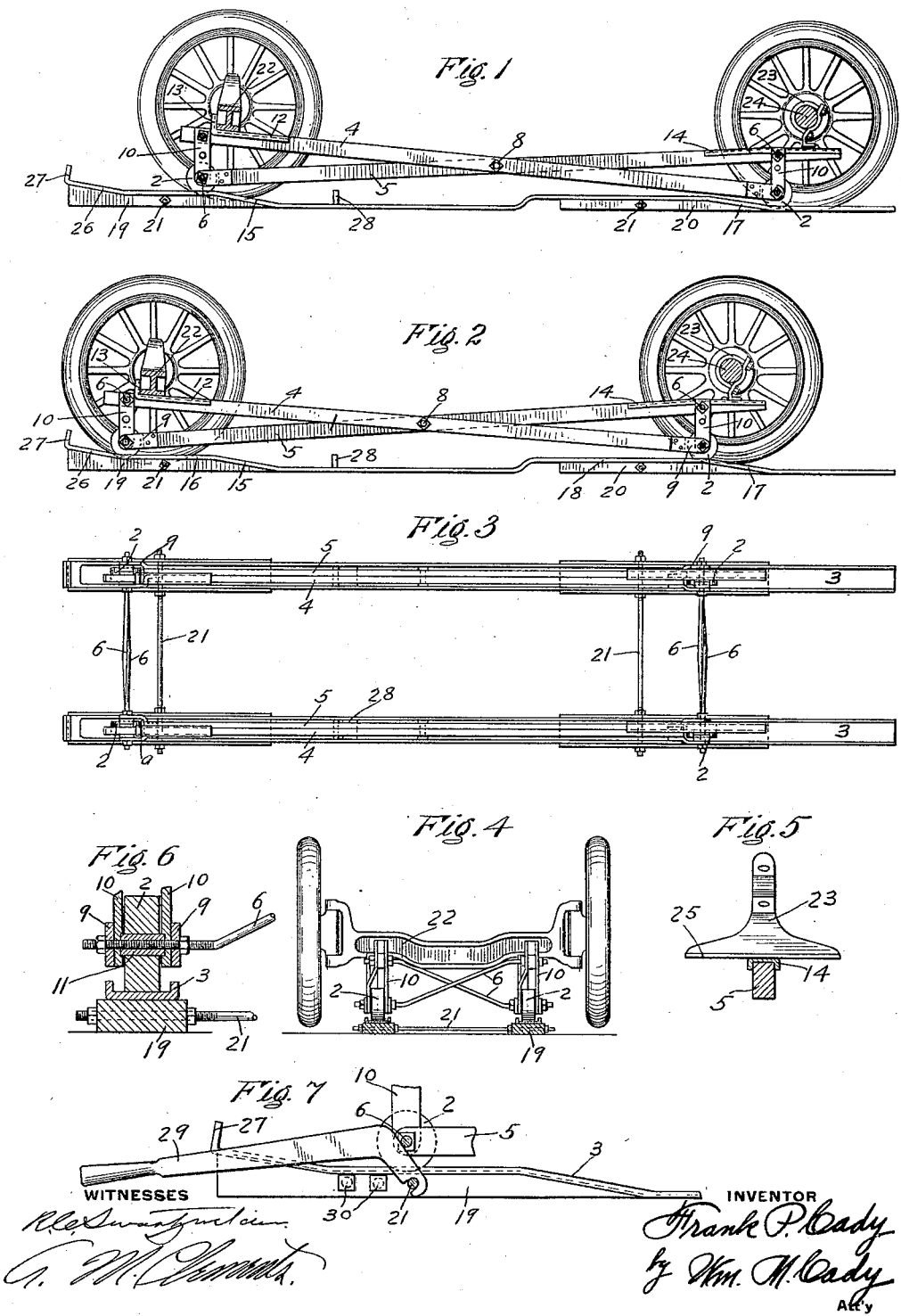
F. P. CADY.
LIFTING DEVICE FOR MOTOR VEHICLES.
APPLICATION FILED JULY 25, 1913.
1,133,703. Patented Mar. 30, 1915.

FRANK P. CADY, OF CLEVELAND, OHIO, ASSIGNOR TO THE CADY PATENT APPLIANCE COMPANY, OF CLEVELAND, OHIO, A CORPORATION OF OHIO.

LIFTING DEVICE FOR MOTOR-VEHICLES.

1,133,703.

Specification of Letters Patent.

Patented Mar. 30, 1915.

Application filed July 25, 1913. Serial No. 781,107.

*To all whom it may concern:*

Be it known that I, FRANK P. CADY, a citizen of the United States, residing at Cleveland, in the county of Cuyahoga and State of Ohio, have invented new and useful Improvements in Lifting Devices for Motor-Vehicles, of which the following is a specification.

This invention relates to lifting devices, and more particularly to a device of this character adapted for lifting motor vehicles.

It is often necessary to raise a motor vehicle off its wheels so as to permit the removal of wheels and for the purpose of repair, and the like, and it is also desirable to support the vehicle when not in use with the wheels raised from the floor so as to relieve the tires of the weight of the car. This may be accomplished by the use of manually operated jacks or similar devices, but this method is slow and laborious and furthermore, it is often difficult to place the jacks in proper position for raising the vehicle.

The principal object of my invention is to provide improved means for lifting a motor vehicle in which the motive power of the vehicle is utilized for effecting the elevation of the vehicle.

In the accompanying drawing; Figure 1 is a vertical longitudinal section of a motor vehicle lifting device embodying my invention, showing the forward axle of the vehicle elevated; Fig. 2 a similar view, showing both the forward and rear axles of the vehicle in the raised position; Fig. 3 a plan view thereof; Fig. 4 a front end view thereof, with the track in section; Fig. 5 a detail view of one of the rear axle clips; Fig. 6 a detail vertical section of a truck wheel portion; and Fig. 7 a fragmentary sectional view, showing a lever mechanism for starting the truck down the track inclines.

According to my invention, a four wheel truck 1 is employed having truck wheels 2 adapted to travel on rails 3. The truck may comprise parallel side frames each formed of crossed frame members 4 and 5, preferably of wood and pivotally connected together at the crossing point by a bolt 8. The opposing ends of the frame members are spaced apart at the front and rear portions of the truck by uprights formed of plates 10 applied on opposite sides of each frame member. The side frames are connected together to form the truck by means of lateral crossed tie rods 6 which preferably serve also as the means for securing the upright plates 10 in position instead of employing separate bolts therefor. For this purpose, the tie rods 6 are each screw-threaded at the opposite ends, the four upper ends of the frame members 4 and 5 being clamped between the corresponding upright plates 10 by nuts applied to the threaded ends of the tie rods.

The four lower ends of the frame members 4 and 5 are each provided with two side plates 9 forming a yoke and within the yoke are mounted the lower ends of each pair of upright plates 10. The upright plates 10 are spaced apart by a bushing 11 adapted to seat in counterbores in the plates 10, said bushing forming the bearing for a corresponding truck wheel 2. The threaded lower end of each tie rod extends through the bushing 11 and the adjacent upright plates and yoke plates, and all the parts are securely clamped together by nuts, as shown in Fig. 6. The tie rods 6 are preferably threaded for a distance each side of the clamped members so as to permit of adjusting the width of the truck to accommodate vehicles of different widths and additional holes may be provided in the upright plates 10 adapted to receive the upper ends of the tie rods 6 so that, if desired, the height of the truck may be varied.

At the forward end of the truck, the frame members are provided with stops 12 preferably formed of a piece of channel iron fitting over and secured to the top face of each frame member 4 and having the forward end turned up to form a projection 13. At the rear of the truck, the upper end portions of the frame members 5 may be provided with wear plates 14, preferably formed of a piece of channel iron adapted to fit over the frame member and secured thereto.

The track or run-way for the truck 1 may comprise rails 3 preferably formed of channel iron arranged with the flanges of the channel uppermost, the truck wheels 2 being adapted to travel in the channels.

The rails 3 are provided with a forward inclined portion 15 terminating in an upper level portion 16, and a rear inclined portion 17 terminating in an upper level portion 18.

The spaces between the raised portions of the rails and the floor at the front and rear are filled in by the respective filling blocks 19 and 20 secured to the rails and said blocks are tied together by means of tie rods 21 having screw-threaded ends supplied with nuts, the rods being threaded for a distance out from the filling blocks to permit adjustment of the track to the desired spacing, corresponding with the spacing of the truck wheels. The forward inclines 15 are so positioned with respect to the rear inclines 17 that the forward truck wheels 2 will ride up the forward incline 15 while the rear truck wheels remain on the floor level.

In operation, the motor vehicle is driven by its own power over the truck 1 until the front axle 22 of the vehicle engages the stops 13 at the forward end of the truck 1, then further movement of the motor vehicle pushes the truck forward and causes the front truck wheels 2 to ascend or ride up the front inclines 15. In this ascent, the under side of the front vehicle axle 22 engages the portions 12 of the truck and the front end of the vehicle is thereupon elevated and the front wheels lifted off the floor. As the front wheels of the truck reach the upper level portion 16 of the track, the rear truck wheels start to ascend the rear inclines 17 and the plates 14 engaging with clips 23, or directly with the rear axle 24 of the motor vehicle, as will be further explained hereinafter, the rear end of the vehicle is elevated and the rear wheels are lifted from the floor. As soon as the rear wheels are lifted, it will be obvious that the vehicle loses its power to propel, but the momentum of the vehicle then operates to push the truck forward and thereby cause the rear truck wheels to ride up the rear inclines 17 and finally engage the upper levels 18.

It will be noted that in operation the motor vehicle must first pass over the rear portion of the truck until the front axle engages the stops 13 and in order to prevent possible interference, the rear end of the truck is made at least as low and preferably a little lower than the forward end of the truck and as the rear axle of a motor vehicle is usually higher than the front axle, I provide means for taking up the space between the rear axle and the truck. For this purpose preferably a clip 23 is secured to each side of the rear axle in position to engage with a corresponding frame member 5. Said clips preferably have a laterally extended portion 25 adapted to engage the top of the plate 14 so as to provide for variations in alinement as the vehicle moves onto the truck and variations in vehicle widths and the like. The same result may be secured by making the rear track inclines enough higher than the forward inclines to compensate for the difference in axle clearance, but I prefer to employ the axle clips.

In order to provide for slight variations in the height of the front axle due to construction or to differences in the degree of inflation of the front wheel tires, the truck is preferably constructed so as to have an inch or more clearance between the front axle and the forward engaging portion of the truck when the truck is on the floor level and a clearance is also provided between the rear axle and the rear engaging portion of the truck. It will be noted that with clearances provided, as above described, the front and rear truck wheels ride a slight distance up their respective inclines before lifting engagement takes place.

In order to check the forward movement of the truck, in case the vehicle should happen to move up too violently, a second incline 26 may be provided at the forward ends of the track having an upturned end portion 27, the incline 26 taking care of most excessive movements, while the portion 27 acts as a positive stop.

Stops 28, which may be sections of angle iron, are secured on the rails 3 at a point to the rear of the front inclines 15 in order to limit the rearward movement of the truck.

While ordinarily the vehicle may be readily pushed back down the inclines without mechanical aid, if desired, a lever 29 may be provided for this purpose.

As shown in Fig. 7, the lever 29 may be provided with an offset end portion adapted to engage one of the tie rods 6 of the truck and having a recess within which either the tie rod 21 or one of the lag screws 30 may engage, according to the position of the truck on the track, the rod acting as a fulcrum, so that upon raising the lever 29 from the floor, the offset portion pushes against the tie rod 6 and moves the truck to the track inclines.

By means of my invention, a motor vehicle may be run into the garage and up onto the lifting truck without getting out of the car or without having to stop the engine, thus saving time and labor. The car is thus accessible for repairs and by supporting the car on the truck when not in use the life of the tires is extended.

Having now described my invention, what I claim as new and desire to secure by Letters Patent, is:—

1. In a device for lifting motor cars, the combination with front and rear inclined planes, of a truck provided with means for supporting a motor car and having front and rear wheels adapted to engage the respective inclined planes and spaced apart a greater distance than the inclined planes.

2. In a device for lifting motor cars, the combination with a track having a front and a rear incline, of a truck provided with means for supporting a motor car and having front and rear wheels for engaging the track and spaced apart a greater distance than the inclines to permit the front wheels to engage the front incline of the track in advance of the engagement of the rear wheels with the rear incline and thereby elevate the front end of the car before the rear end is elevated.

3. In a lifting device for motor cars, the combination with a truck adapted to be propelled by a motor car, of front and rear inclines arranged in alinement and front and rear members carried by the truck for engaging said inclines, the inclines being spaced apart a lesser distance than the engaging members of the truck.

4. In a lifting device for motor cars, the combination with a track having front and rear inclines, of a truck provided with front and rear wheels for engaging said inclines, said wheels being spaced apart a greater distance than the inclines to thereby cause the front wheels to ascend the front inclines in advance of the ascent of the rear inclines by the rear wheels of the truck.

5. In a device for lifting motor vehicles, the combination with a track having forward and rear inclines, of a truck provided with forward wheels adapted to run up the forward incline and rear wheels adapted to run up the rear incline, said forward and rear wheels being spaced apart a greater distance than the inclines, and means on the truck adapted to be engaged by the vehicle in motion to first cause the forward wheels of the truck to run up the forward incline and thereby lift the front end of the vehicle and then cause the rear truck wheels to ride up the rear incline and thereby lift the rear end of the vehicle.

6. In a lifting device for motor cars, the combination with a track, of a truck adapted to be propelled by the vehicle and having front and rear wheels adapted to run on the track, said track having front and rear inclines spaced apart a less distance than the truck wheels with level track on each side of the inclines to thereby cause the front wheels of the truck to ascend the front incline while the rear wheels are on level track and the rear wheels to ascend the rear incline while the front wheels are on level track.

7. In a lifting device for motor cars, the combination with a track having front and rear inclines leading to level track at the upper and lower ends, of a truck adapted to be propelled by a motor car and provided with front and rear wheels adapted to run on the track and spaced apart a greater distance than the track inclines, so that the front wheels ride up the front inclines from the lower to the upper level track in advance of the movement of the rear wheels up the rear inclines from the lower to the upper level track.

8. In a device for lifting a motor vehicle, the combination with a truck adapted to be propelled by the vehicle and having front and rear wheels, of a track for the truck wheels having a front incline and a rear incline followed by a level section for the front and rear wheels to ride on respectively and a second front incline for the front truck wheels to ride on while the rear wheels are running on said level section for checking the forward movement of the truck.

In testimony whereof I have hereunto set my hand.

FRANK P. CADY.

Witnesses:
J. HORACE JONES,
ROBT. O. CADY.

Copies of this patent may be obtained for five cents each, by addressing the "Commissioner of Patents, Washington, D. C."